United States Patent
Stone et al.

(10) Patent No.: US 11,135,785 B2
(45) Date of Patent: Oct. 5, 2021

(54) ROTARY COMPACTION TOOL

(71) Applicant: The Boeing Company, Chicago, IL (US)

(72) Inventors: Paul R. Stone, Federal Way, WA (US); David Lynn Phillips, Buckley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/511,926

(22) Filed: Jul. 15, 2019

(65) Prior Publication Data

US 2019/0337244 A1 Nov. 7, 2019

Related U.S. Application Data

(62) Division of application No. 15/692,939, filed on Aug. 31, 2017, now Pat. No. 10,391,723.

(51) Int. Cl.
| | |
|---|---|
| *B29C 70/38* | (2006.01) |
| *B29C 70/40* | (2006.01) |
| *B25J 9/12* | (2006.01) |
| *B25J 15/06* | (2006.01) |
| *B25J 15/00* | (2006.01) |
| *B25J 11/00* | (2006.01) |

(52) U.S. Cl.
CPC .............. *B29C 70/38* (2013.01); *B25J 9/126* (2013.01); *B25J 11/005* (2013.01); *B25J 15/0019* (2013.01); *B25J 15/0616* (2013.01); *B29C 70/388* (2013.01); *B29C 70/40* (2013.01)

(58) Field of Classification Search
CPC ........ B29C 70/38; B29C 70/388; B29C 70/40

USPC .......................................................... 156/242
See application file for complete search history.

(56) References Cited

U.S. PATENT DOCUMENTS

| | | | | |
|---|---|---|---|---|
| 4,461,669 | A | | 7/1984 | Dontscheff |
| 4,601,775 | A | | 7/1986 | Grone |
| 5,427,518 | A | * | 6/1995 | Morizot ............... B29C 31/085 100/211 |
| 7,017,961 | B1 | | 3/2006 | Parnell et al. |
| 7,452,016 | B2 | * | 11/2008 | Tanae .................. B65G 47/911 294/64.3 |
| 8,100,413 | B2 | * | 1/2012 | Otaguro ................ B65G 47/91 279/3 |

(Continued)

FOREIGN PATENT DOCUMENTS

| | | |
|---|---|---|
| CN | 1326851 | 12/2001 |
| CN | 1653534 | 8/2005 |

(Continued)

OTHER PUBLICATIONS

English Translation of WO2016193019A1 (Year: 2016).*

(Continued)

*Primary Examiner* — Matthew J Daniels
*Assistant Examiner* — Hana C Page
(74) *Attorney, Agent, or Firm* — Yee & Associates, P.C.

(57) ABSTRACT

A method for placing a piece of composite material onto a substrate. The piece of composite material is placed on the substrate with using an end effector. The piece of composite material is held against the substrate using the end effector. The piece of the composite material is compacted against the substrate while also holding the piece of composite material against the substrate using the end effector.

20 Claims, 12 Drawing Sheets

(56) References Cited

U.S. PATENT DOCUMENTS

| | | | |
|---|---|---|---|
| 8,454,788 | B2 | 6/2013 | Kisch |
| 9,889,610 | B2 | 2/2018 | DesJardien et al. |
| 2009/0145545 | A1 | 6/2009 | Brennan et al. |
| 2010/0320642 | A1 | 12/2010 | Weimer et al. |
| 2012/0330453 | A1 | 12/2012 | Sangari et al. |
| 2014/0060732 | A1 | 3/2014 | Shair et al. |
| 2014/0292010 | A1 | 10/2014 | Graupner et al. |
| 2014/0367037 | A1 | 12/2014 | Metschan et al. |
| 2016/0332394 | A1 | 11/2016 | Ghapman et al. |
| 2017/0001343 | A1 | 1/2017 | Tsuruta et al. |
| 2017/0050393 | A1* | 2/2017 | Duclos .............. B29C 31/085 |
| 2018/0065257 | A1* | 3/2018 | Iwasaka ........... H01L 21/67766 |
| 2019/0061281 | A1 | 2/2019 | Stone et al. |

FOREIGN PATENT DOCUMENTS

| | | |
|---|---|---|
| CN | 101001743 | 7/2007 |
| CN | 102837434 | 12/2012 |
| CN | 202781850 | 3/2013 |
| CN | 103619567 | 3/2014 |
| CN | 204422306 | 6/2015 |
| CN | 204977504 | 1/2016 |
| CN | 105563849 | 5/2016 |
| CN | 105592995 | 5/2016 |
| CN | 105619835 | 6/2016 |
| CN | 206286798 | 6/2017 |
| CN | 206321490 | 7/2017 |
| EP | 1334819 | 4/2010 |
| EP | 2952316 | 12/2015 |
| EP | 3406430 A1 | 11/2018 |
| WO | WO 2008023293 | 2/2008 |
| WO | WO2014140146 A1 | 9/2014 |
| WO | WO2015151054 A1 | 10/2015 |
| WO | WO2016193019 A1 | 12/2016 |

OTHER PUBLICATIONS

Great Britain Intellectual Property Office Combined Search and Examination Report under Sections 17 and 18(3), dated Jan. 30, 2019, regarding Application No. GB1813530.1, 9 pages.

Office Action, dated Oct. 29, 2018, regarding U.S. Appl. No. 15/692,969, 15 pages.

Notice of Allowance, dated Apr. 15, 2019, regarding U.S. Appl. No. 15/692,939, 9 pages.

Great Britain Intellectual Property Office Examination Report under Section 18(3), dated Sep. 27, 2019, regarding Application No. GB1813530.1, 2 pages.

National Intellectual Property Administraction, People's Republic of China, Notification of the First Office Action regarding Application No. 201810979182X, dated Jul. 15, 2021, 23 pages.

\* cited by examiner

ROTARY COMPACTION TOOL

CROSS-REFERENCE TO RELATED APPLICATION

This application is a Divisional of U.S. patent application Ser. No. 15/692,939, entitled "Rotary Compaction Tool," and filed Aug. 31, 2017, which is incorporated herein by reference in its entirety.

BACKGROUND INFORMATION

1. Field

The present disclosure relates generally to manufacturing composite parts and, in particular, to a method and apparatus for compacting composite materials in a process for manufacturing composite parts.

2. Background

In manufacturing composite structures, layers of composite material may be laid up on a tool. The layers of composite material may be comprised of fibers in sheets. These sheets may take the form of, for example, without limitation, fabrics, tape, tows, or other suitable configurations for the sheets. In some cases, resin may be infused or pre-impregnated into the sheets. These types of sheets are commonly referred to as prepreg.

Currently, devices for placing tape, such as a graphite tape, have difficulty in picking up and placing the tape. For example, currently available devices for placing tape have difficulty in maintaining the position of the tape after placement of the tape on a multilayer material such as a charge. When laying up a graphite tape to form a multilayer material, it is desirable to chill the graphite tape while the graphite tape is being cut to avoid the buildup of resin on the blade.

The colder temperature, however, makes keeping the graphite tape in the desired position on the multilayer material more difficult. In other words, the graphite tape may not adhere as desired at the colder temperature. It is also desirable to heat the graphite tape so that when placed on the charge, the graphite tape will adhere to previous layers in charge. Having both hot and cold temperatures at the same time is unfeasible.

Therefore, it would be desirable to have a method and apparatus that take into account at least some of the issues discussed above, as well as other possible issues. For example, it would be desirable to have a method and apparatus that overcome a technical problem with laying up layers in the multilayer material.

SUMMARY

An embodiment of the present disclosure provides a method for placing a piece of composite material onto a substrate. The piece of composite material is placed on the substrate using an end effector. The piece of composite material is held against the substrate using the end effector. The piece of the composite material is compacted against the substrate while also holding the piece of composite material against the substrate using the end effector.

Another embodiment of the present disclosure provides an end effector. The end effector comprises a rotary actuator that is rotatable about an axis, a force transfer system that is rotatably connected to the rotary actuator in which the force transfer system is rotatable by the rotary actuator, and a flexible membrane connected to the rotary actuator in which the flexible membrane does not rotate and the flexible membrane has an engagement surface that is configured to contact a multilayer material and the force transfer system.

Yet another embodiment of the present disclosure provides a method for compacting a multilayer material. A rotary actuator in an end effector is moved along an axis towards the multilayer material such that a flexible membrane connected to the rotary actuator contacts the multilayer material at an engagement surface of the flexible membrane in which the flexible membrane does not rotate. A force is applied on the flexible membrane using a force transfer system in the end effector that is rotatably connected to the rotary actuator. The force transfer system is rotated about the axis by the rotary actuator such that the force transfer system causes the flexible membrane to deform and compact the multilayer material using a sweeping motion while holding a piece of composite material in place.

Another embodiment of the present disclosure provides a manufacturing system. The manufacturing system comprises a robot, an end effector, and a controller. The controller is configured to control the robot to move the end effector to pick up a piece of composite material from a source of composite material using the end effector. The controller then moves the piece on a path to a tool using the end effector, and place the piece on the tool such that the piece is compacted while stationary on a multilayer material laid up on the tool using the end effector.

Yet another embodiment of the present disclosure provides an end effector. The end effector comprises a rotary actuator, a force transfer system, a flexible membrane, a biasing system, and a vacuum cup. The rotary actuator is rotatable about an axis and moveable along the axis in a linear direction in which the rotary actuator comprises a shaft extending along the axis, wherein the shaft does not rotate during operation of the rotary actuator. The rotary actuator also comprises an impeller that is translatable along the shaft. The rotary actuator yet also comprises a body moveably connected to the shaft, wherein the body is rotatable about the axis and moveable along the axis. The rotary actuator also comprises a flange extending from the body, wherein ball transfer units in the force transfer system are connected to the flange and in which the rotary actuator rotates about the axis such that the force transfer system moves in a circular path and deforms an engagement surface as the rotary actuator rotates. The force transfer system is rotatably connected to the rotary actuator in which the force transfer system is rotatable by the rotary actuator. The flexible membrane is connected to the rotary actuator in which the flexible membrane does not rotate and the flexible membrane has the engagement surface that is configured to contact a multilayer material and the force transfer system. The biasing system is operable to bias the rotary actuator along the axis towards the multilayer material. The vacuum cup is connected to the rotary actuator, wherein the vacuum cup applies a vacuum between the rotary actuator and a piece of the multilayer material in contact with the vacuum cup when negative pressure is applied through the vacuum cup in which the flexible membrane extends from the vacuum cup, and in which the flexible membrane has a thickness that allows flexing of the flexible membrane by the force transfer system when the rotary actuator is biased towards the multilayer material such that the engagement surface of the flexible membrane engages the multilayer material, and wherein the thickness prevents mark-off from occurring on the multilayer material, in which a sensor system detects a presence of the piece at a source of composite material and a controller is configured to control a robot to move to pick up the piece from the source of composite material using the end effector when the piece is detected. The sensor system moves the piece on a path to a tool using the end effector, places the piece on the tool such that the piece is compacted while stationary on the multilayer material laid up on the tool using the end effector, and releases the piece from the end effector after compacting the piece. The piece remains in place on the multilayer material.

Yet another embodiment of the present disclosure provides a method for placing a piece of a composite material. The piece of the composite material is picked up from a source using an end effector using a vacuum applied to the piece. The end effector is moved along a path towards a multilayer material with a piece of the multilayer material attached to a flexible membrane in the end effector using the vacuum applied to the piece of the multilayer material. The piece is placed on the multilayer material on a tool. A rotary actuator in the end effector is moved along an axis towards the multilayer material using a biasing system that is operable to bias the rotary actuator along the axis towards the multilayer material such that a flexible membrane connected to the rotary actuator contacts the multilayer material at an engagement surface of the flexible membrane in which the flexible membrane does not rotate. The rotary actuator comprises a shaft extending along the axis in which the shaft does not rotate during operation of the rotary actuator; an impeller that is translatable along the shaft, a body moveably connected to the shaft in which the body is rotatable about the axis and moveable along the axis, and a flange extending from the body in which ball transfer units in a force transfer system are connected to the flange. A force is applied on the flexible membrane using the force transfer system in the end effector that is rotatably connected to the rotary actuator. The force transfer system is rotated about the axis by the rotary actuator such that the force transfer system moves in a circular path and causes the flexible membrane to deform and compact the multilayer material with a sweeping motion. The piece from the end effector is released in which the piece remains in place on the multilayer material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
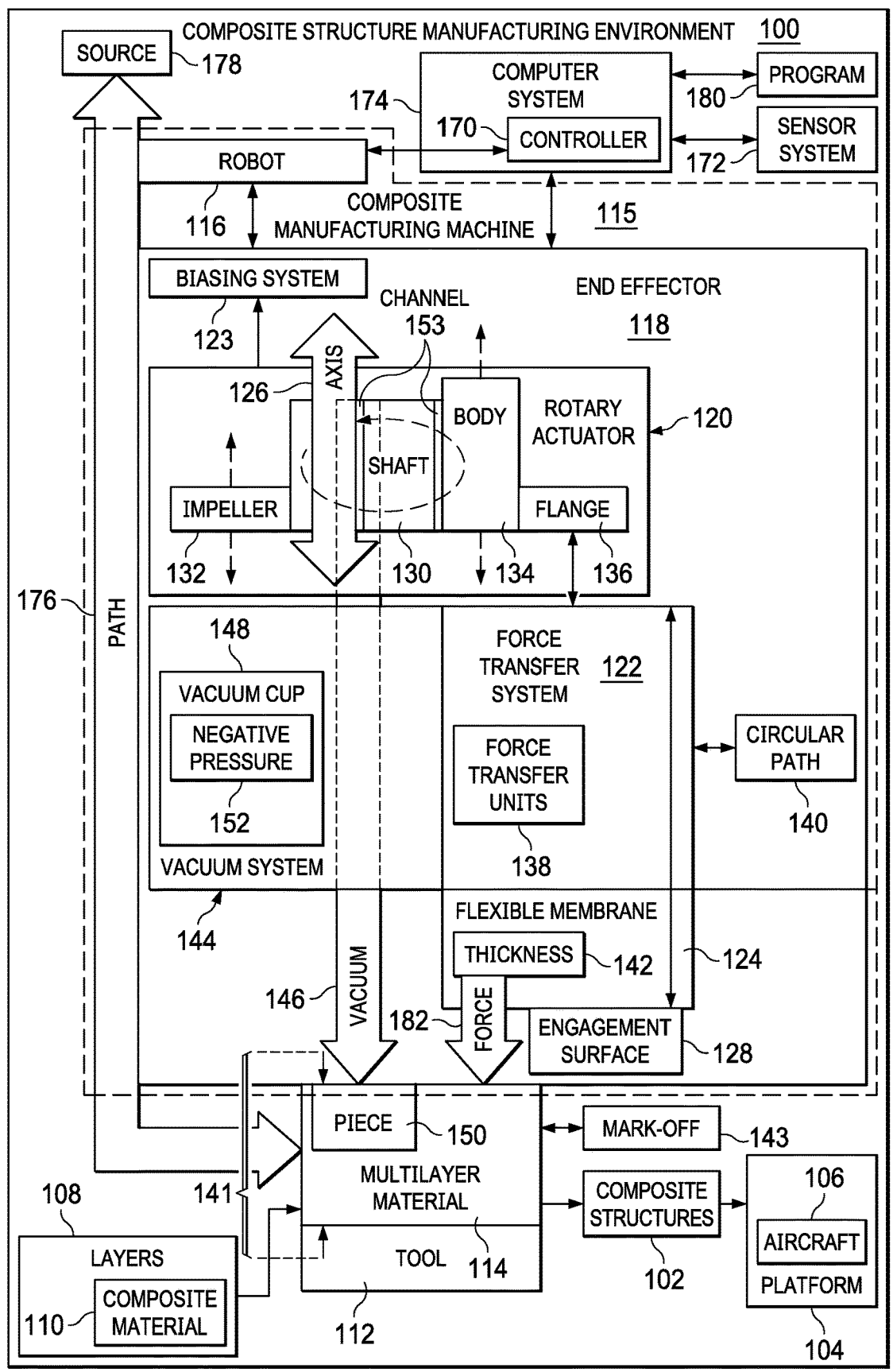
FIG. 1 is an illustration of a block diagram of a composite structure manufacturing environment in accordance with an illustrative embodiment.

The illustrative embodiments recognize and take into account one or more different considerations. For example, the illustrative embodiments recognize and take into account that trade-offs between heating and chilling a composite material, such as tape, for placement in building a multilayer material, such as a charge, is often undesirable. For example, the illustrative embodiments recognize and take into account that current solutions rely on manipulating the temperature of the tape to cause the tape to adhere on demand.

However, the illustrative embodiments recognize and take into account that manipulating the temperature is not as efficient as desired. The illustrative embodiments also recognize and take into account that cooling graphite tape below the dew point of the environment can cause condensation on the tape, which can make placement and adhesion difficult. The condensation on the tape is considered a contaminant, resulting in the discarding of the graphite tape.

The illustrative embodiments also recognize and take into account that chilling the tape to a cool enough temperature for cutting and then heating the tape to a warm enough temperature for maintaining the position after placement is unfeasible within a short period of time. The illustrative embodiments recognize that it is not possible to have the tape be both hot and cold simultaneously. The illustrative embodiments also recognize and take into account that chilling and then subsequent heating of the tape may take more time than desired with the speed that is desired to meet production and other requirements.

The illustrative embodiments also recognize and take into account that compaction may be used to cause the tape to stick in the location where the tape was placed. The illustrative embodiments recognize and take into account that controlling the tackiness of the tape without heating the tape may be desirable. The illustrative embodiments recognize and take into account that compaction may work more efficiently with a sweeping motion while the tape is held in the desired location. The illustrative embodiments recognize and take into account that one solution is having a device that holds the tape in place while compacting with a sweeping motion is currently unavailable.

Thus, the illustrative embodiments provide a method, apparatus, and system for compacting a multilayer material. In one illustrative example, a rotary actuator in an end effector is moved along an axis towards the multilayer material such that a flexible membrane connected to the rotary actuator contacts the multilayer material at an engagement surface of the flexible membrane in which the flexible membrane does not rotate. A force is applied on the flexible membrane using a force transfer system in the end effector that is rotatable connected to the rotary actuator. The force transfer system is rotated about the axis by the rotary actuator such that the force transfer system causes the flexible membrane to deform and compact the multilayer material.

With reference now to the figures and, in particular, with reference to FIG. 1, an illustration of a block diagram of a composite structure manufacturing environment is depicted in accordance with an illustrative embodiment. In this illustrative example, composite structure manufacturing environment 100 is an environment in which composite structures 102 may be manufactured for platform 104. In this illustrative example, platform 104 takes the form of aircraft 106.

In manufacturing of composite structures 102, layers 108 of composite material 110 are laid up on tool 112 to form multilayer material 114. As depicted, composite material 110 is fabricated from two or more materials.

Composite material 110 in this depicted example includes fiber reinforced polymers (FRPs). Fiber reinforced polymers may include carbon fiber reinforced polymer (CFPs), glass fiber reinforced plastic (GRP), or other suitable types of fiber reinforced polymers.

Multilayer material 114 may be a charge or may be cut to form charges. Multilayer material 114 may be shaped and cured to manufacture one or more of composite structures 102.

The different layers in layers 108 of composite material 110 may be comprised of different types of composite material 110 and may have different orientations with respect to other layers in layers 108. The different types of composite material 110 may include different types of fibers as well as different types of resins and different types of weaves. These resins may be thermoplastic or thermoset in the illustrative examples. For example, multilayer material 114 may be selected from at least one of a tape, a graphite tape, a glass fiber tape, a fabric, a prepreg, or some other suitable type of composite material or precursor for forming a composite material.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, tool 112 may take a number of different forms. For example, tool 112 may be selected from a group comprising a mold, an inner mold line tool, an outer mold line tool, a mandrel, a conveyor belt, a table for forming composite charges, a shuttle table, a stationary table, or some other suitable type of tool on which layers 108 of composite material 110 may be laid up in manufacturing of composite structures 102.

In this illustrative example, composite manufacturing machine 115 operates to form multilayer material 114. Composite manufacturing machine 115 comprises robot 116 and end effector 118. Robot 116 is a piece of equipment that operates to carry out operations in manufacturing of composite structures 102. Robot 116 may be programmed to perform one or more operations and may be reprogrammable to change the types of operations. In some cases, robot 116 may include artificial intelligence processes.

For example, robot 116 may be used to perform operations including at least one of welding, cutting, installing fasteners, painting, assembling, picking and placing composite materials, inspecting, and other suitable types of operations. Robot 116 may take a number of different forms. For example, robot 116 may be selected from a group comprising a robotic arm, a crawler, a drone, or some other suitable form.

As depicted, robot 116 includes end effector 118. End effector 118 is removably connected to robot 116. End effector 118 is a device connected to robot 116. As used herein, a first component "connected to" a second component means that the first component, end effector 118, can be connected directly or indirectly to the second component, robot 116. In other words, additional components may be present between the first component and the second component.

The first component is considered to be indirectly connected to the second component when one or more additional components are present between the two components. When the first component is directly connected to the second component, no additional components are present between the two components.

For example, end effector 118 may be located at the end of a robotic arm. As depicted, end effector 118 comprises rotary actuator 120, force transfer system 122, biasing system 123, and flexible membrane 124.

As depicted, rotary actuator 120 is rotatable about axis 126. Force transfer system is rotatably connected to rotary actuator 120. Force transfer system 122 is rotatable by rotary actuator 120 in this particular example.

Flexible membrane 124 is connected to rotary actuator 120 in which flexible membrane 124 does not rotate. In this illustrative example, flexible membrane 124 has engagement surface 128 that is configured to contact multilayer material 114 and force transfer system 122.

In this illustrative example, rotary actuator 120 includes a number of different components. As depicted, rotary actuator 120 comprises shaft 130, impeller 132, body 134, and flange 136.

As depicted, shaft 130 extends along axis 126. Shaft 130 does not rotate during operation of rotary actuator 120 in this example. Impeller 132 is translatable along shaft 130. In other words, impeller 132 may move along shaft 130.

In this illustrative example, body 134 is moveably connected to shaft 130. Body 134 is rotatable about axis 126 and moveable along axis 126.

As illustrated, flange 136 extends from body 134. Force transfer units 138 in force transfer system 122 are connected to flange 136.

During operation, rotary actuator 120 rotates about axis 126 such that force transfer system 122 moves in circular path 140. As depicted, circular path 140 may result in a sweeping motion of force transfer units 138 and force transfer system 122. Further, during movement of force transfer system 122 in circular path 140, force transfer system 122 deforms engagement surface 128 as rotary actuator 120 rotates causing force transfer system 122 to move in circular path 140. The deformation of engagement surface 128 may result in compaction 141 of at least one of piece 150 of composite material 110 or multilayer material 114.

Further, rotary actuator 120 is moveable along axis 126 in a linear direction. As depicted, biasing system 123 is operable to bias rotary actuator 120 along axis 126 towards multilayer material 114.

In the illustrative example, flexible membrane 124 has thickness 142 that allows for flexing of flexible membrane 124 by force transfer system 122 when rotary actuator 120 is biased towards multilayer material 114. The flexing caused by force transfer system 122 is such that engagement surface 128 of flexible membrane 124 engages multilayer material 114.

In this illustrative example, the engagement is such that piece 150 of composite material 110 placed on multilayer material 114 remains stationary from force applied by flexible membrane 124 using force transfer system 122. Further, thickness 142 of flexible membrane 124 is selected to prevent mark-off 143 from occurring on piece 150 and multilayer material 114.

End effector 118 also may include vacuum system 144. In this illustrative example, vacuum system 144 causes vacuum 146 between rotary actuator 120 and multilayer material 114 during operation of rotary actuator 120. As depicted, vacuum system 144 includes vacuum cup 148 which is connected to rotary actuator 120. Vacuum cup 148 applies vacuum 146 between rotary actuator 120 and piece 150 of composite material 110 in contact with vacuum cup 148 when negative pressure 152 is applied through vacuum cup. Vacuum 146 may be applied through channel 153 extending through shaft 130 or from a tube (not shown) connected to vacuum cup 148.

In this illustrative example, flexible membrane 124 extends from vacuum cup 148. Flexible membrane 124 may extend as a flange from vacuum cup 148. Flexible membrane 124 may be comprised of the same type of material as vacuum cup 148 or of a different type material.

In this illustrative example, movement of robot 116 and the control of end effector 118 may be performed using controller 170 and sensor system 172. In the illustrative example, controller 170 and sensor system 172 may be associated with robot 116 or may be in a remote location to robot 116. In either case, controller 170 is in communication with robot 116 and sensor system 172.

When one component is "associated" with another component, the association is a physical association. For example, a first component, controller 170 or sensor system 172, may be considered to be physically associated with a second component, robot 116, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both. As depicted, sensor system 172 is a physical hardware system that detects information about the environment around robot 116.

As depicted, controller 170 may be implemented in software, hardware, firmware, or a combination thereof. When software is used, the operations performed by controller 170 may be implemented in program code configured to run on hardware, such as a processor unit. When firmware is used, the operations performed by controller 170 may be implemented in program code and data and stored in persistent memory to run on a processor unit. When hardware is employed, the hardware may include circuits that operate to perform the operations in controller 170.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, controller 170 may be located in computer system 174. Computer system 174 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, end effector 118 on robot 116 moves on path 176 between source 178 of composite material 110 for piece 150 and tool 112, where multilayer material 114 is being laid up. This movement of end effector 118 may occur with robot 116 moving along path 176. In some illustrative examples, when robot 116 is an arm, robot 116 moves end effector 118. Source 178 of composite material 110 may take a number of different forms. For example, source 178 of composite material 110 may be an automatic feed and cutting device, a tape dispenser, or some other suitable source.

In this illustrative example, controller 170 controls the movement of end effector 118 along path 176. Path 176 may be defined in program 180. Program 180 may be, for example, a computer numerical control (CNC) program or some other suitable program code that may be used to control the operation of robot 116 and end effector 118.

Path 176 may be a path along which obstacles are unexpected. For example, sensor system 172 may detect obstacles, multilayer material 114 on tool 112, and other information about composite structure manufacturing environment 100.

In this illustrative example, sensor system 172 may include a number of different sensors used by controller 170 to control robot 116 to pick up piece 150, traverse path 176, and place piece 150 on multilayer material 114 laid up on tool 112. For example, sensor system 172 may include at least one of a camera, an ultrasonic sensor, a vacuum gage, a force sensing device, a load cell, or other suitable sensors. For example, a vacuum gage in sensor system 172 may be used to determine if end effector 118 has picked up piece 150 from source 178 of composite material 110.

In another illustrative example, sensor system 172 may be utilized to detect engagement between engagement surface 128 and multilayer material 114 laid up on tool 112. Further, sensor system 172 may be configured to detect the amount of force 182 applied through flexible membrane 124 by force transfer system 122. For example, force 182 is selected to be from about 80 pounds to about 90 pounds for stringers in one illustrative example.

In this manner, controller 170 may control robot 116 in laying up multilayer material 114 on tool 112. For example, controller 170 may be configured to control robot 116 to move end effector 118 to pick up piece 150 from source 178 of composite material 110 using end effector 118, move piece 150 to tool 112 using end effector 118, and place piece 150 on tool 112 such that piece 150 is compacted while stationary on multilayer material 114 laid up on tool 112 using end effector 118. In the illustrative example, controller 170 controls movement of end effector 118 connected to robot 116 along path 176 using at least one of program 180 or sensor system 172. In this manner, sensor system 172 detects piece 150 when piece 150 is present at source 178 of composite material 110, and controller 170 controls movement of end effector 118 along path 176 to pick up piece 150, move piece 150 along path 176 to tool 112, and place piece 150 on tool 112 using sensor system 172.

In one illustrative example, one or more technical solutions are present that overcome a technical problem with laying up layers in the multilayer material. As a result, one or more technical solutions may provide a technical effect moving a piece of composite material to the location on the multilayer material being laid up. One or more technical solutions may also provide a technical effect of applying force to the multilayer material with piece 150 in place to compact multilayer material 114. In this manner, the sweeping motion along with force for compaction may occur with one or more of the technical solutions. This compaction may enable piece 150 to adhere to other pieces in multilayer material 114.

For example, end effector 118 may be utilized to place a graphite tape on a tool with other pieces of graphite tape or layers of constant material to form a charge. End effector 118 also may be used to apply force to the graphite tape placed on the charge in which the force is applied with a sweeping motion while holding the graphite tape in a stationary position using a vacuum. This force in a sweeping motion compacts the graphite tape with the other layers in a manner that causes the graphite tape to adhere to the other layers on the charge. As a result, the graphite tape may be chilled but placed to adhere to the charge without heating the graphite tape or the charge. Thus, end effector 118 may be used to more quickly form a charge for use in manufacturing of composite structures 102. This type of process may be applied to any piece of composite material 110 that may be used to form multilayer material 114 in the illustrative examples.

The illustration of composite structure manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative example is described with respect to platform 104 as aircraft 106, another illustrative example may be applied to other types of platforms. Platform 104 may be, for example, a mobile platform, a stationary platform, a land-based structure, an aquatic-based structure, and a space-based structure. More specifically, platform 104 may be a surface ship, a tank, a personnel carrier, a train, a spacecraft, a space station, a satellite, a submarine, an automobile, a power plant, a bridge, a dam, a house, a manufacturing facility, a building, a kitchen sink, and other suitable platforms.

Figure 2:
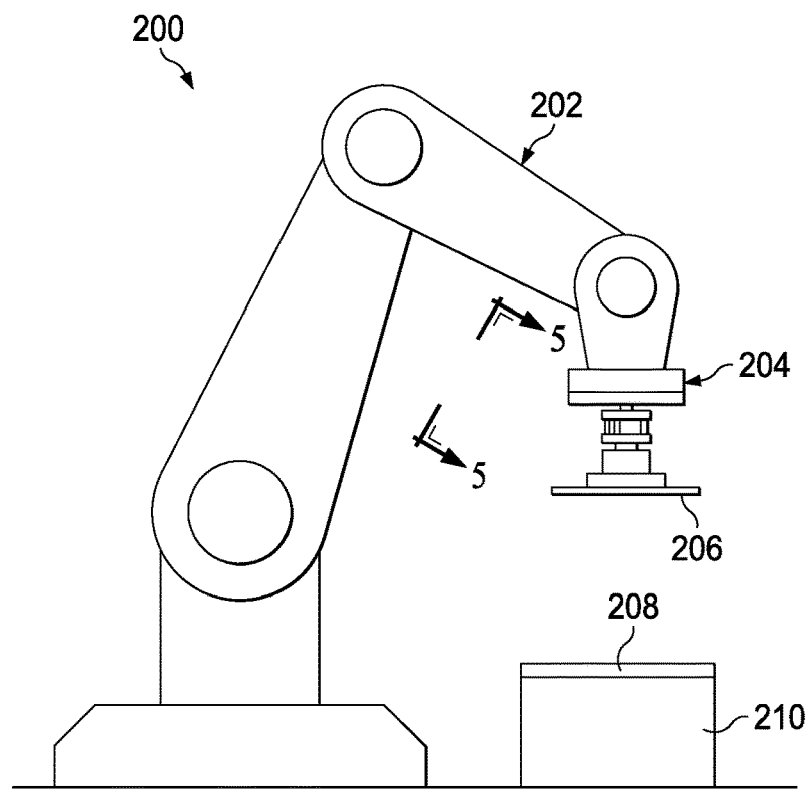
FIG. 2 is an illustration of a composite structure manufacturing environment in accordance with an illustrative embodiment.

With reference now to FIG. 2, an illustration of a composite structure manufacturing environment is depicted in accordance with an illustrative embodiment. Composite structure manufacturing environment 200 is an example of one physical implementation for composite structure manufacturing environment 100 shown in block form in FIG. 1.

As depicted, composite structure manufacturing environment 200 includes robotic arm 202. Robotic arm 202 is an example of one implementation for robot 116 shown in block form in FIG. 1. In this depicted example, end effector 204 is a device at the end of robotic arm 202 and may be used to transport and place tape 206. End effector 204 is an example of an implementation of end effector 118 shown in block form in FIG. 1. As depicted, tape 206 is picked up by robotic arm 202 for placement on multilayer material 208 on tool 210.

Figure 3:
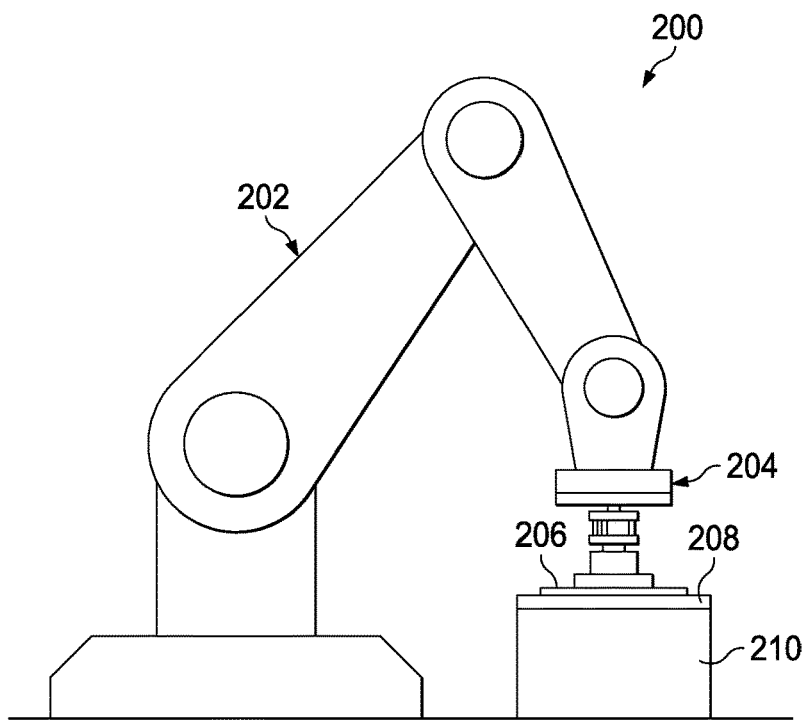
FIG. 3 is an illustration of a process for compacting a tape in a composite structure manufacturing environment in accordance with an illustrative embodiment.

Turning next to FIG. 3, an illustration of a process for compacting a tape in a composite structure manufacturing environment is depicted in accordance with an illustrative embodiment. In the illustrative examples, the same reference numeral may be used in more than one figure. This reuse of a reference numeral in different figures represents the same element in the different figures.

Figure 4:
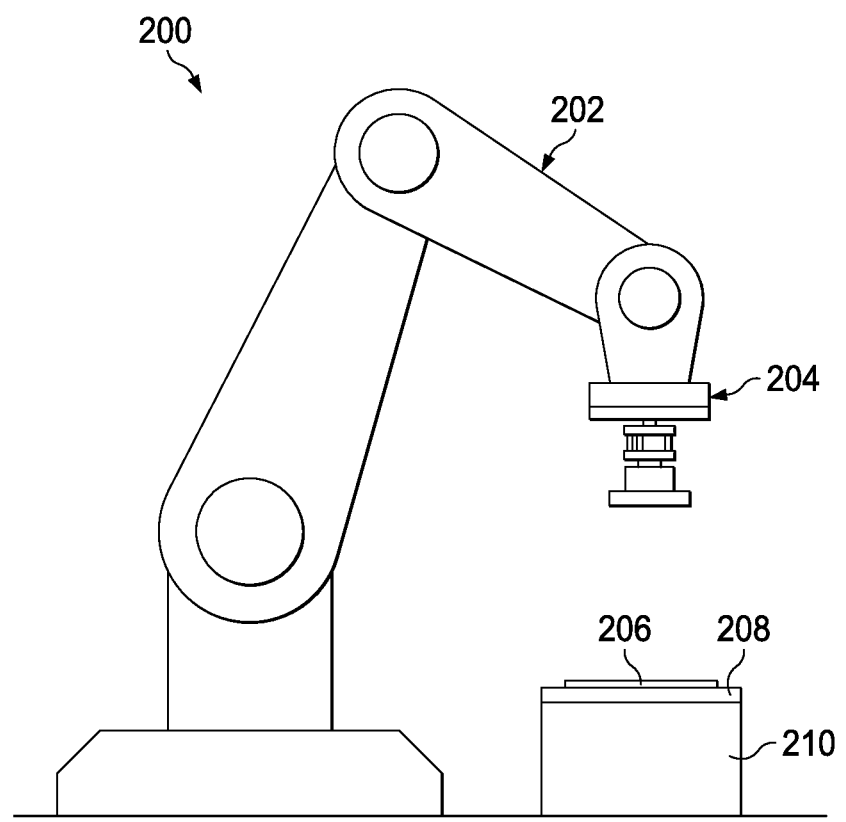
FIG. 4 is an illustration of a tape on a multilayer material in a composite structure manufacturing environment in accordance with an illustrative embodiment.

As depicted, tape 206 has been placed on multilayer material 208. Robotic arm 202 with end effector 204 compacts tape 206 and multilayer material 208 such that tape 206 remains in place With reference now to FIG. 4, an illustration of a tape on a multilayer material in a composite structure manufacturing environment is depicted in accordance with an illustrative embodiment. In this illustrative example, robotic arm 202 has released tape 206 from end effector 204. In this illustrative example, tape 206 remains on multilayer material 208 and is now considered part of multilayer material 208.

Figure 5:
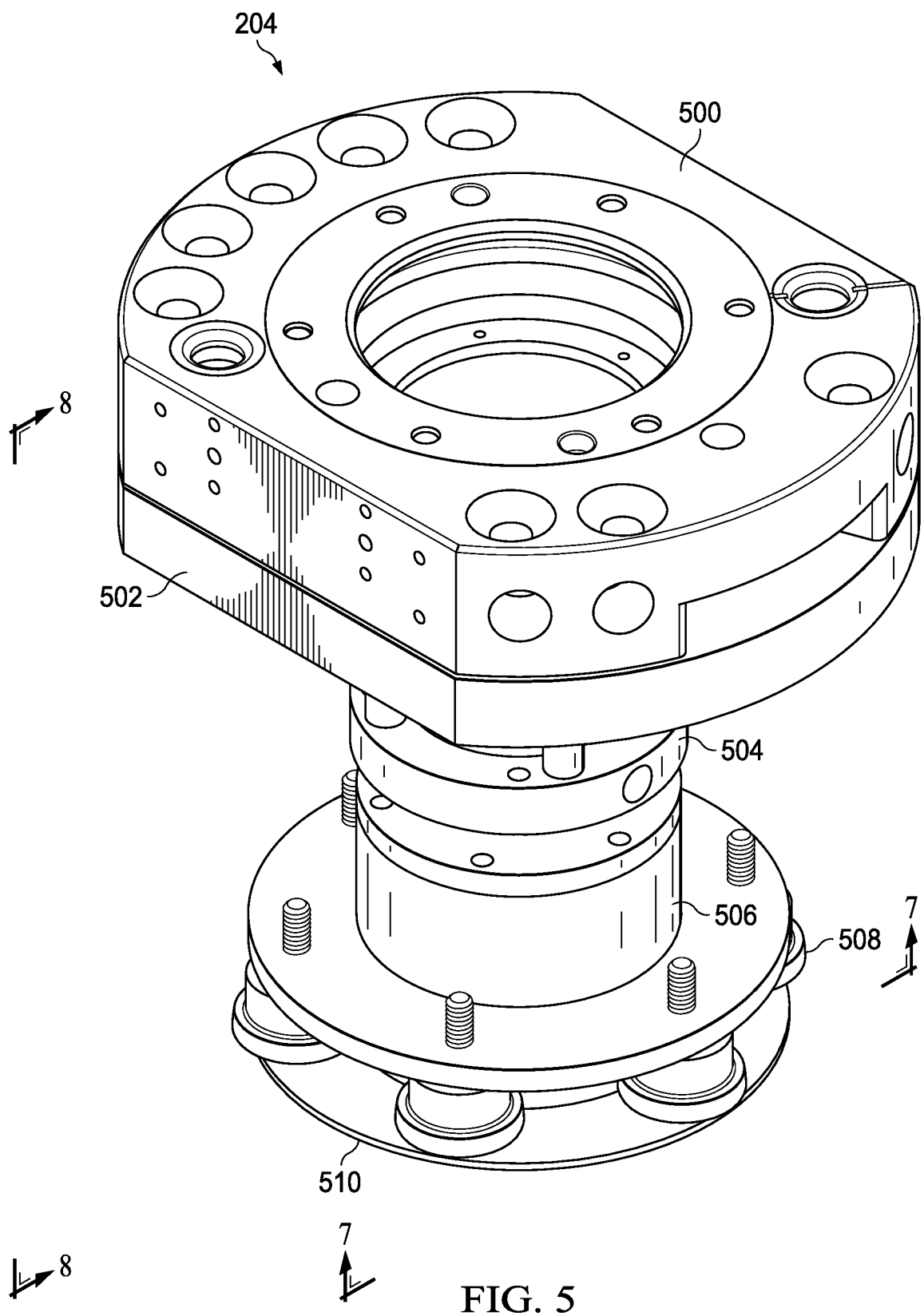
FIG. 5 is an illustration of an end effector in accordance with an illustrative embodiment.

With reference next to FIG. 5, an illustration of an end effector is depicted in accordance with an illustrative embodiment. In this figure, an isometric view of end effector 204 in the direction of lines 5-5 in FIG. 2 is shown. As depicted in this view, coupler 500, adapter plate 502, air cylinder 504, rotary actuator 506, and force transfer system 508 are shown. These components may be comprised of a number of different materials. For example, materials may be selected from at least one of aluminum, a polycarbonate, a plastic, steel, or some other suitable type of material.

Flexible membrane 510 is shown for end effector 204. As depicted, flexible membrane 510 may be comprised of one or more materials that allow flexible membrane 510 to flex and be deformed. For example, flexible membrane 510 may be comprised of a number of materials selected from at least one of an elastomer, a polyethelene, nylon, a polyoxymethylene, an acetal homopolymer, a polyurethane, polyester, a composite material, or some other suitable material.

Air cylinder 504 is an example of a component in biasing system 123 shown in block form in FIG. 1. Rotary actuator 506, force transfer system 508, and flexible membrane 510 are examples of a physical implementation for rotary actuator 120, force transfer system 122, and flexible membrane 124 shown in block form in FIG. 1.

As depicted, coupler 500 and adapter plate 502 are structures used to connect end effector 204 to robotic arm 202 or some other robot. These components may be comprised of a number of different materials. For example, coupler 500 and adapter plate 502 may be comprised of a number of materials selected from at least one of metal, ceramic, aluminum, a polycarbonate, a plastic, steel, or some other suitable type of material.

The application of force to flexible membrane 510 by force transfer system 508 deforms flexible membrane 510. The deformation compacts a multilayer material (not shown) that may be in contact with flexible membrane 510.

Figure 6:
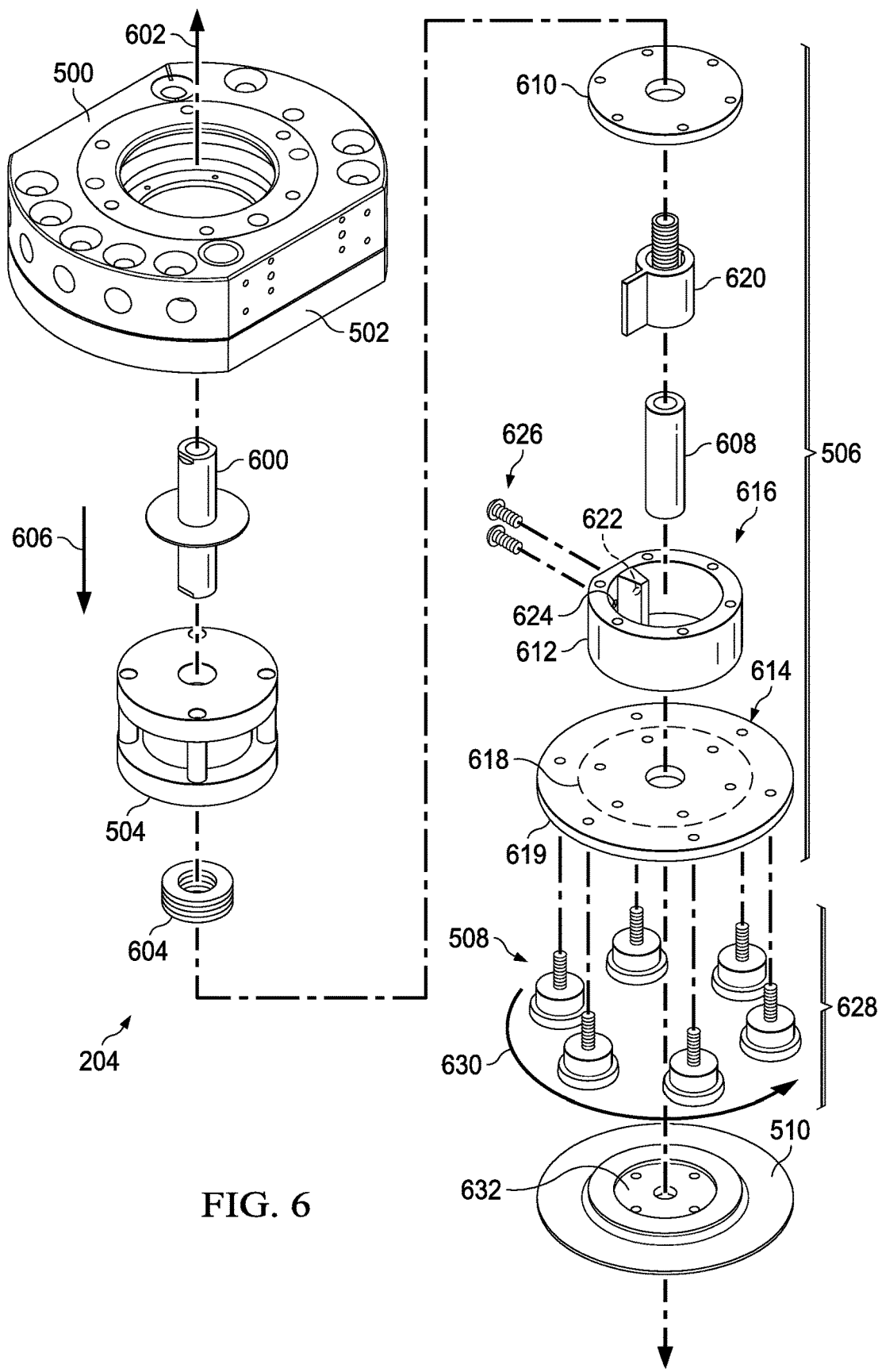
FIG. 6 is an illustration of an exploded view of an end effector in accordance with an illustrative embodiment.

With reference next to FIG. 6, an illustration of an exploded view of an end effector is depicted in accordance with an illustrative embodiment. In this figure, an exploded view of end effector 204 in FIG. 5 is depicted.

In this exploded view, shaft 600 is a structure on which air cylinder 504 may travel. Axis 602 extends centrally through shaft 600 and other portions of end effector 204.

In this illustrative example, slip disks 604 along with air cylinder 504 comprise a biasing system. Other components may be used in addition to or in place of slip disks 604. For example, active magnetic bearings and thrust bearings also may be used.

Shaft 608 extends through slip disks 604. Slip disks 604 are moveable along shaft 608 and bear down on rotary actuator 506 when air cylinder 504 is biased in the direction of arrow 606. In the illustrative example, a single shaft may be used in place of shaft 600 and shaft 608.

In this depicted example, disk 610, cylinder 612, and disk 614 form body 616 for rotary actuator 506. When connected to cylinder 612, circular section 618 forms flange 619 for rotary actuator 506. As depicted, rotary actuator 506 may move along axis 602 and may rotate about axis 602.

In this example, shaft 608 does not rotate. Impeller 620 is connected to cylinder 612 in body 616 by fasteners 626. Impeller 620 is connected to shaft 608 and also does not rotate. The rotation of body 616 may occur through the introduction of a liquid into body 616 through port 622 or port 624.

Force transfer units 628 are connected to flange 619. As depicted, force transfer units 628 move along circular path 630 when rotary actuator 506 rotates about axis 602. In this illustrative example, force transfer units 628 includes spherical balls. In other illustrative examples, force transfer units 628 may utilize tapered rollers, cylinders, or other types of units that may transfer force to flexible membrane 510 as force transfer units 628 move about circular path 630.

In this illustrative example, vacuum cup 632 is shown with flexible membrane 510 extending from vacuum cup 632. Vacuum cup 632 may be connected to shaft 608.

Figure 7:
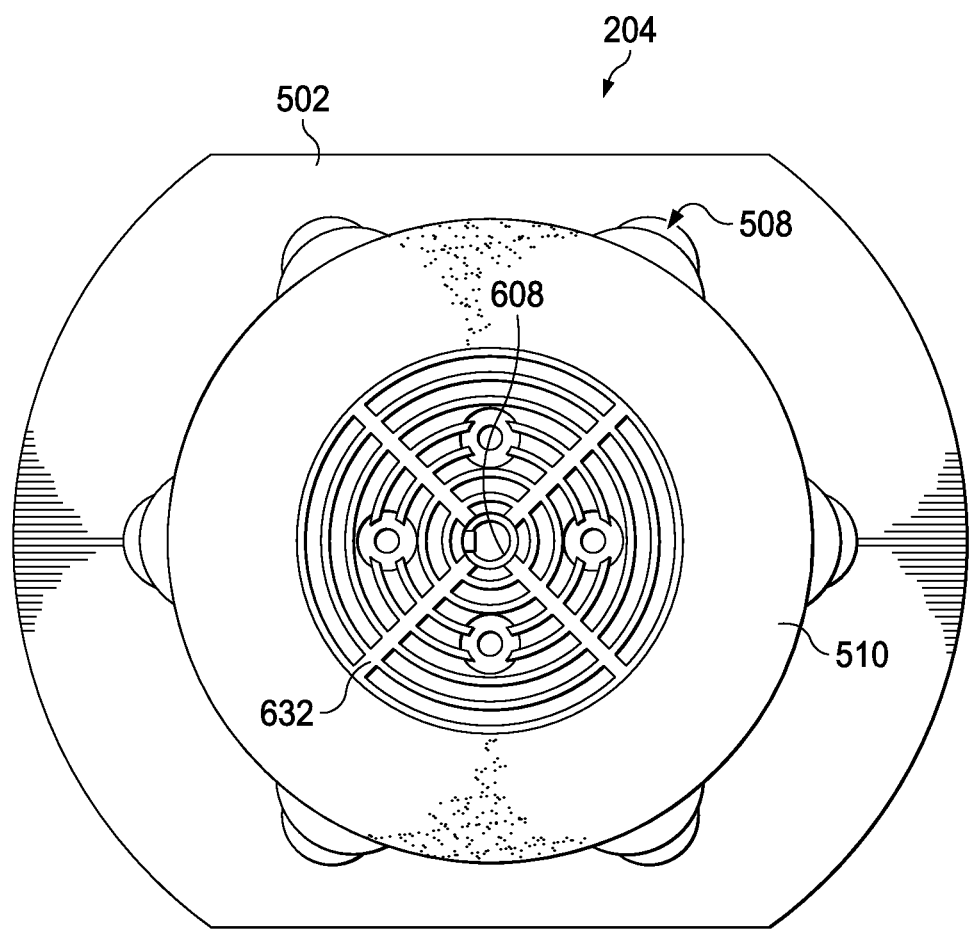
FIG. 7 is an illustration of an end effector in an unbiased position in accordance with an illustrative embodiment.

In FIG. 7, an illustration of an end effector in an unbiased position is depicted in accordance with an illustrative embodiment. In this figure, an end view of end effector 204 is seen in a direction of lines 7-7 as shown in FIG. 5.

Figure 8:
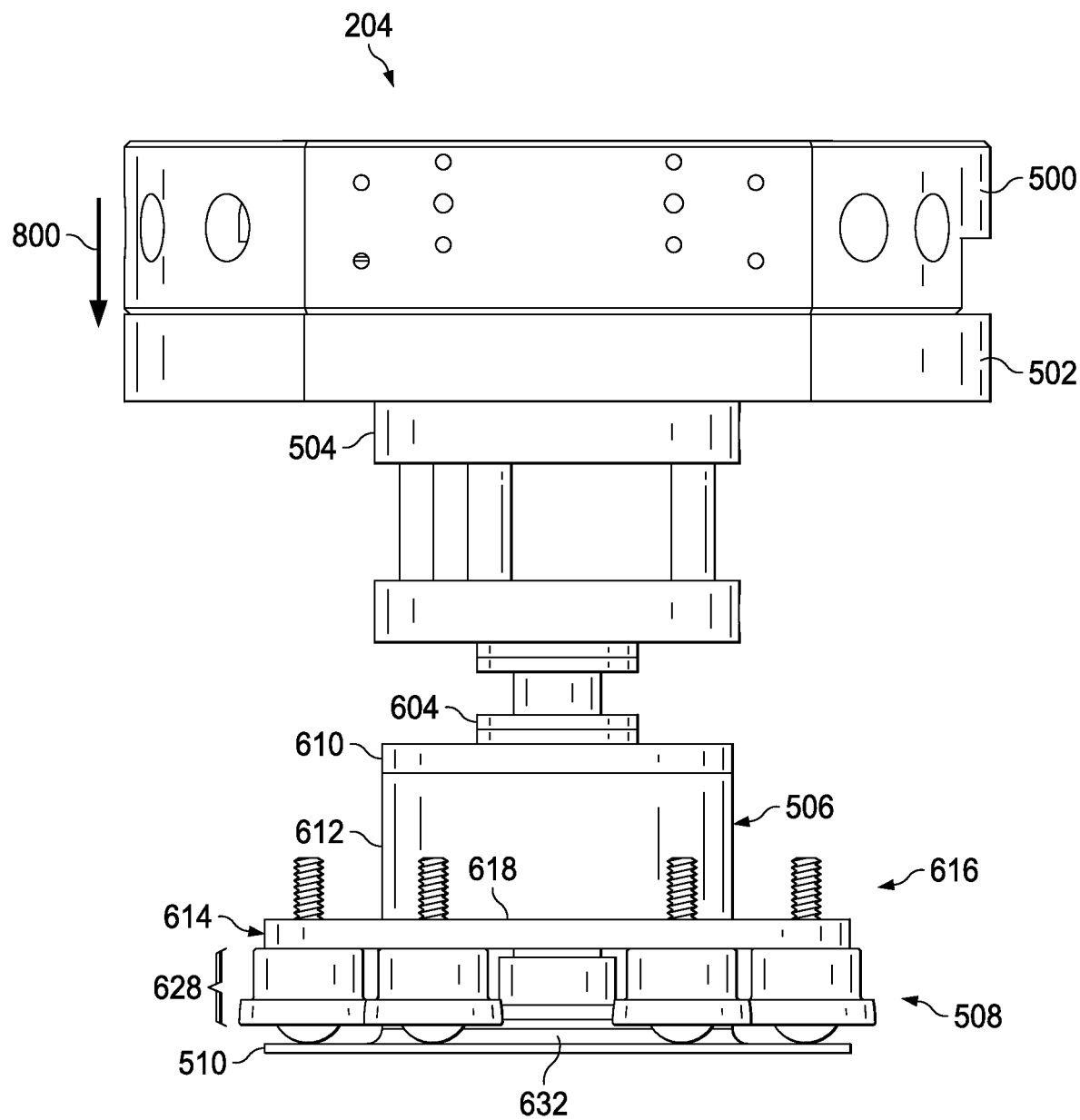
FIG. 8 is an illustration of an end effector in a biased position in accordance with an illustrative embodiment.

With reference now to FIG. 8, an illustration of an end effector in an unbiased position is depicted in accordance with an illustrative embodiment. In this figure, a side view of end effector 204 is seen in a direction of lines 8-8 as shown in FIG. 5.

In this depicted example, air cylinder 504 is shown in an unbiased position in which air cylinder 504 has not moved to bias rotary actuator 506 in the direction of arrow 800. In this unbiased position, force transfer system 508 does not apply force to flexible membrane 510. In this figure, flexible membrane 510 is in an un-deformed state.

Figure 9:
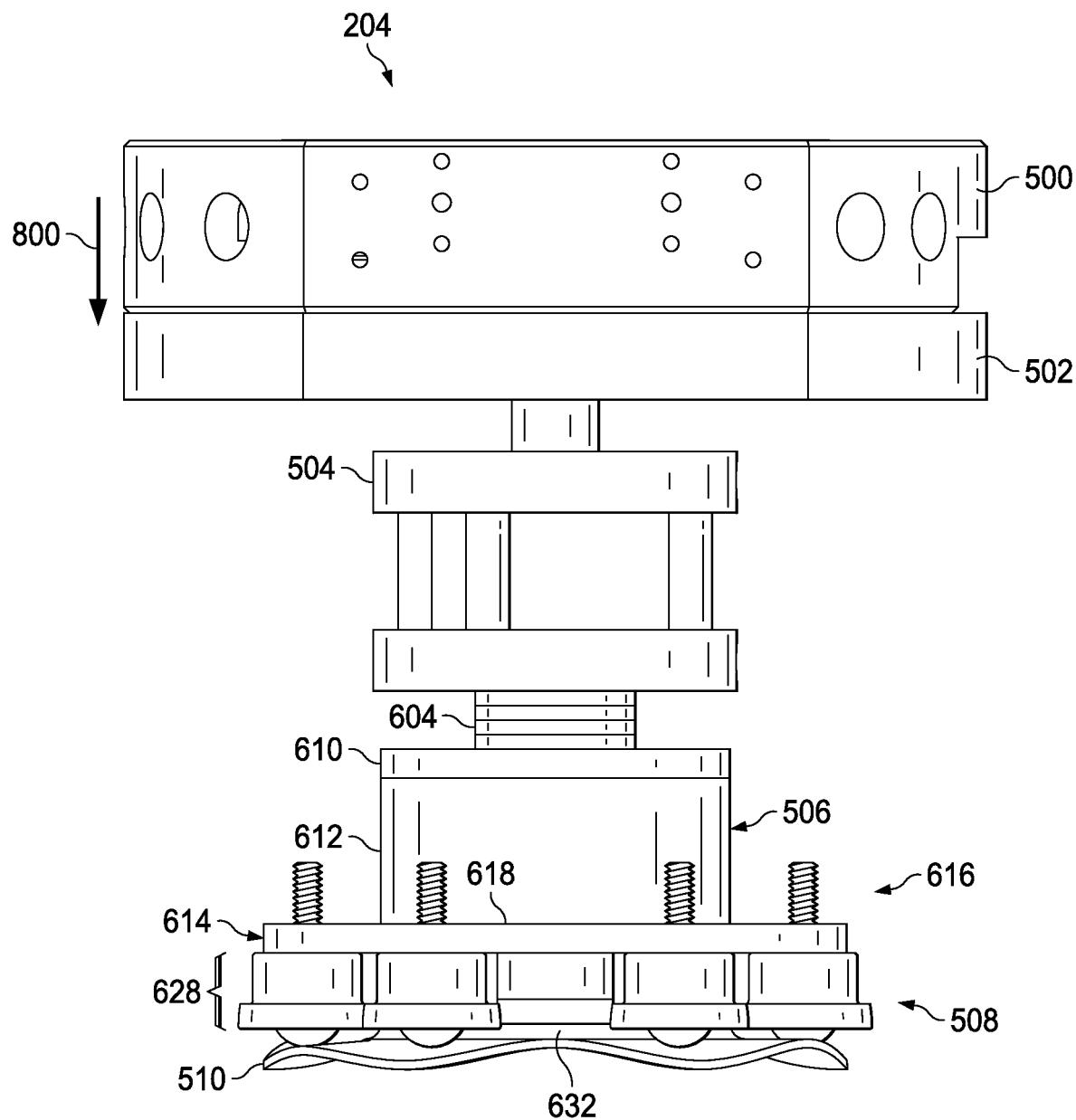
FIG. 9 is an illustration of an end effector in a biased position in accordance with an illustrative embodiment.

With reference next to FIG. 9, an illustration of an end effector in a biased position is depicted in accordance with an illustrative embodiment. In this figure, a side view of end effector 204 is seen in a direction of lines 8-8 as shown in FIG. 5.

In this example, air cylinder 504 is shown in a biased position in which air cylinder 504 has moved in the direction of arrow 800. The movement is such that force is applied to bias rotary actuator 506 by air cylinder 504 via slip disks 604.

In this position, rotary actuator 506 causes force transfer units 628 to apply force on flexible membrane 510. In this figure, flexible membrane 510 is in a deformed state. This force may be used to compact a multilayer material (not shown) such that a piece of the multilayer material, such as a tape (not shown), will stick or remain in place on the multilayer material (not shown).

The illustration of end effector 204 in FIGS. 2-9 is presented as one manner in which end effector 118 shown in block form in FIG. 1 may be implemented. This illustration is not meant to limit the manner in which other illustrative examples may be implemented. For example, in another illustrative example, a spring, an electrical actuator, or some other biasing system may be used in place of or in addition to air cylinder 504. Further, air cylinder 504 is a linear biasing system. In other illustrative examples, a rotary actuator may be used.

Figure 10:
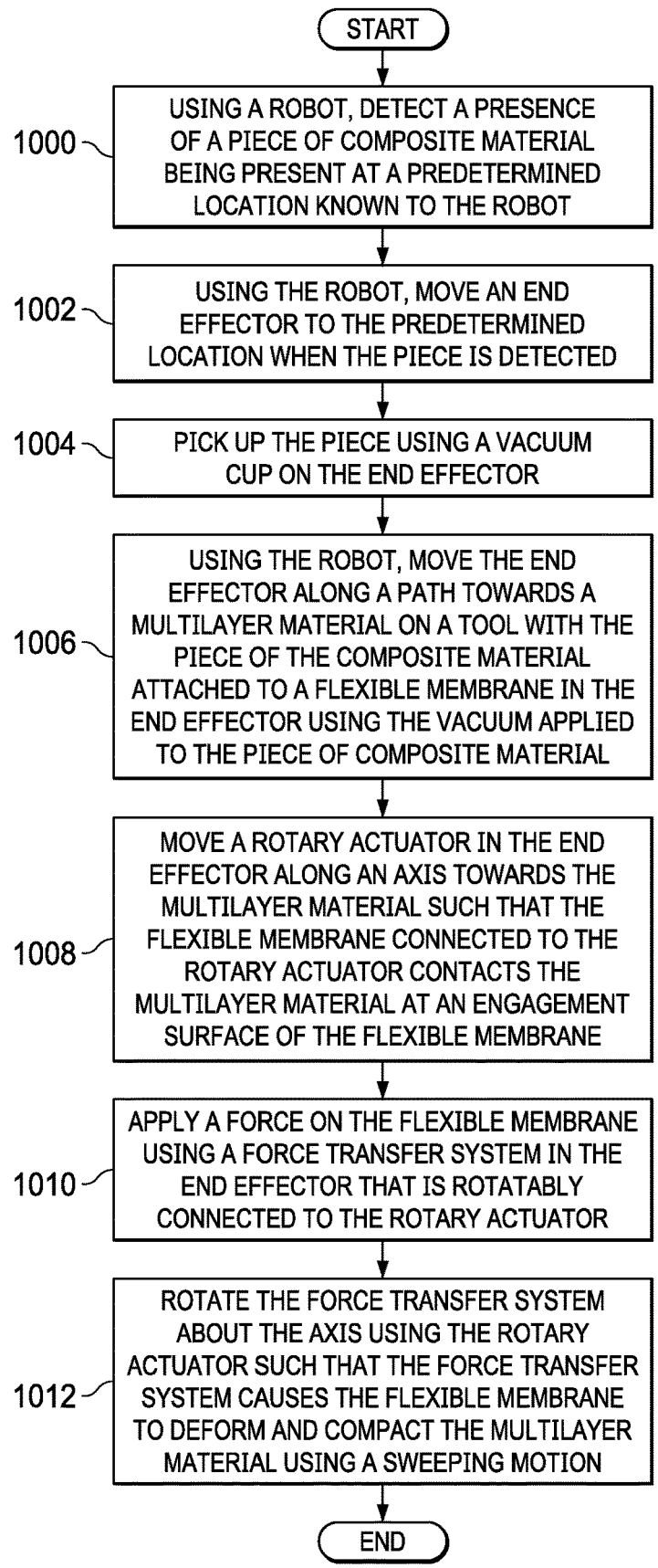
FIG. 10 is an illustration of a flowchart of a process for compacting a multilayer material in accordance with an illustrative embodiment.

Turning next to FIG. 10, an illustration of a flowchart of a process for compacting a multilayer material is depicted in accordance with an illustrative embodiment. The process depicted in this flowchart may be implemented in composite structure manufacturing environment 100 using robot 116 with end effector 118.

The process begins with robot 116 detecting a presence of piece 150 of composite material 110 being present at a predetermined location known to robot 116 (operation 1000). In operation 1000, an automatic feed and cutting device may present piece 150 at the predetermined location known to robot 116. This predetermined location may be a part of programming for robot 116. The programming may be, for example, a computer numeric control (CNC) program. The detection of the presence of piece 150 may be made a number of ways. For example, robot 116 may include a camera that generates data used to detect if piece 150 is present. The data generated by the camera may be used to finalize the location of the piece. The piece may not be in the exact same place each time and the cut of the piece also may affect pickup of the piece. In another illustrative example, the automatic feeding and cutting device may send a signal to robot 116 indicating that piece 150 is ready to be picked up at the predetermined location.

Robot 116 moves end effector 118 to the predetermined location when piece 150 is detected (operation 1002). Additionally, the camera or some other type of vision system may help with finalizing the location of the piece, in case the piece is in a slightly different location from the predetermined location. In operation 1002, the movement is along path 176. The process uses vacuum cup 148 on end effector 118 to pick up piece 150 (operation 1004). In this example, piece 150 is held against flexible membrane 124 when vacuum cup 148 applies the vacuum on piece 150.

Robot 116 moves end effector 118 along path 176 towards multilayer material 114 on tool 112 with piece 150 of composite material 110 attached to flexible membrane 124 in end effector 118 using vacuum 146 applied to piece 150 of composite material 110 (operation 1006). As depicted in operation 1006, vacuum 146 is applied through vacuum cup 148. In this example, end effector 118 holds piece 150 using vacuum 146 generated through vacuum system 144 in end effector 118.

Further, in operation 1006, path 176 of robot 116 to the location of tool 112 for the placement of piece 150 on multilayer material 114 may be programmed for robot 116 using a computer numerical control program. This path may be selected to avoid potential collisions. In another illustrative example, sensors may also be present to detect when objects may be present in the path.

The process moves rotary actuator 120 in end effector 118 along axis 126 towards multilayer material 114 such that flexible membrane 124 connected to rotary actuator 120 contacts multilayer material 114 at an engagement surface 128 of flexible membrane 124 (operation 1008). In operation 1008, rotary actuator 120 is moved along axis 126 in a linear direction towards multilayer material 114 using biasing system 123 that is operable to bias rotary actuator 120 along axis 126 towards multilayer material 114. The surface of multilayer material 114 may be detected, and end effector 118 may be moved without colliding with multilayer material 114 in a number of different ways. For example, at least one of a camera, a force sensing device, a load cell, or some other sensor may be used to detect the surface of multilayer material 114. In the illustrative example, a computer numeric control program for robot 116 may be programmed to apply a desired amount of force on multilayer material 114 laid up on tool 112. The amount of force may be detected using a sensor in the form of a force sensing device.

The contact with multilayer material 114 may be considered an indirect contact with piece 150 being located between flexible membrane 124 and the pieces of multilayer material 114 already laid up on tool 112.

In this illustrative example, this movement results in piece 150 being placed on multilayer material 114. Piece 150 is held against engagement surface 128 of flexible membrane 124 using vacuum system 144 and end effector 118. Further, flexible membrane 124 does not rotate in this illustrative example.

The process applies a force on flexible membrane 124 using force transfer system 122 in end effector 118 that is rotatably connected to rotary actuator 120 (operation 1010).

The process rotates force transfer system 122 about axis 126 using rotary actuator 120 such that force transfer system 122 causes flexible membrane 124 to deform and compact multilayer material 114 using a sweeping motion (operation 1012). The rotation of rotary actuator 120 about axis 126 causes force transfer system 122 to rotate about axis 126 in circular path 140. The process terminates thereafter.

This process may be repeated by placing additional pieces of composite material 110 on multilayer material 114. In this manner, a charge, a preform, or some other layup of composite materials may be made for use in manufacturing a composite structure.

Figure 11:
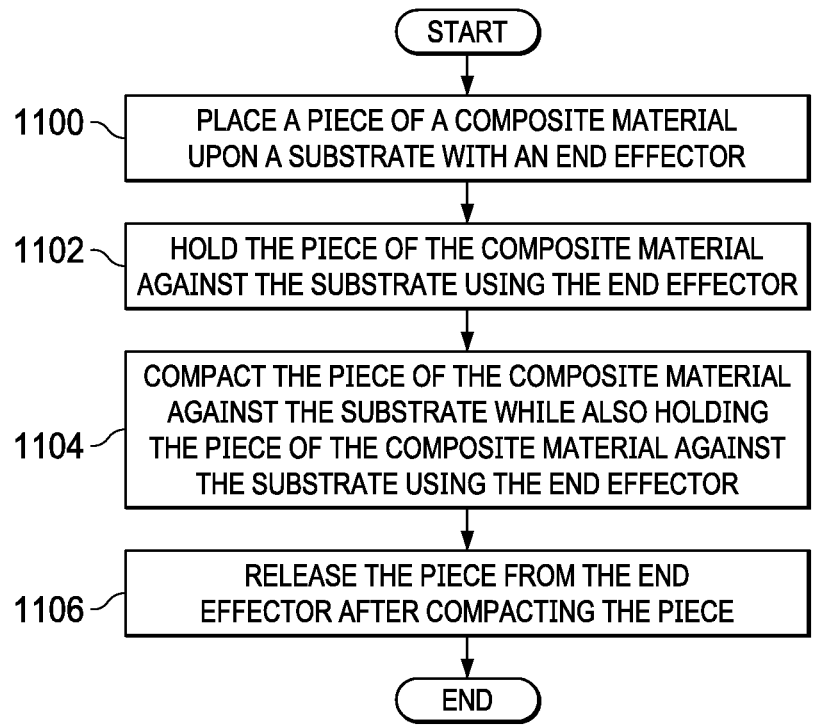
FIG. 11 is an illustration of a flowchart of a process for placing a piece of composite material on a substrate in accordance with an illustrative embodiment.

With reference to FIG. 11, an illustration of a flowchart of a process for placing a piece of composite material on a substrate is depicted in accordance with an illustrative embodiment. The process depicted in this flowchart may be implemented in composite structure manufacturing environment 100 using robot 116 with end effector 118.

The process begins by placing piece 150 of composite material 110 upon a substrate with end effector 118 (operation 1100). The substrate may be tool 112, other layers of multilayer material 114, or some other suitable type of substrate. The process holds piece 150 of composite material 110 against the substrate using end effector 118 (operation 1102). The process compacts piece 150 of composite material 110 against the substrate while also holding piece 150 of composite material 110 against the substrate using end effector 118 (operation 1104).

The process releases piece 150 from end effector 118 after compacting piece 150 (operation 1106). The process terminated thereafter. In operation 1106, piece 150 remains in place on the substrate after being released from end effector 118. When the substrate is multilayer material 114 laid up on tool 112, piece 150 is sufficiently tacky from compaction and sticks to multilayer material 114.

Figure 12:
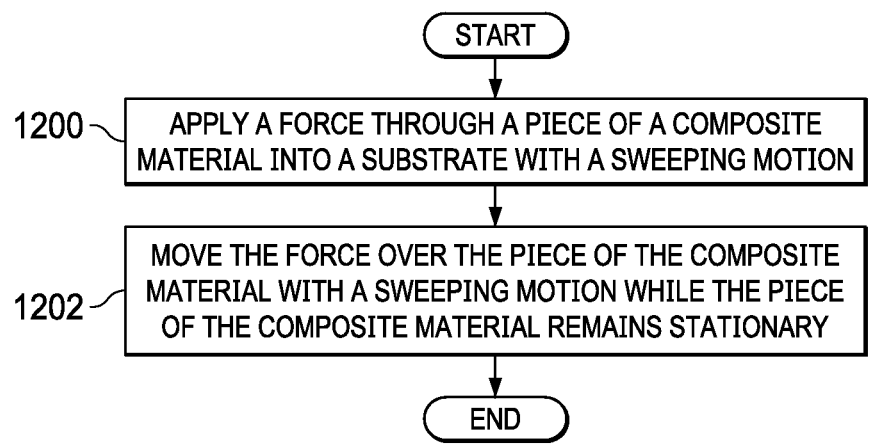
FIG. 12 is an illustration of a flowchart of a process for compacting a piece of composite material in accordance with an illustrative embodiment.

With reference to FIG. 12, an illustration of a flowchart of a process for compacting a piece of composite material is depicted in accordance with an illustrative embodiment. The process in FIG. 12 is an example of one manner in which operation 1104 in FIG. 11 may be implemented.

The process begins by applying force 182 through piece 150 of composite material 110 into a substrate with a sweeping motion (operation 1200). In operation 1200, force 162 is sufficient to compact piece 150 of composite material 110.

The process moves force 182 over piece 150 of composite material 110 with a sweeping motion while piece 150 of composite material 110 remains stationary (operation 1202). The process terminates thereafter. The force is applied to piece 150 through flexible membrane 124 after placement of piece 150. The material in flexible membrane 124 has thickness 142 that is thick enough to not leave mark-off 143 on piece 150 and multilayer material 114 but thin enough to allow placement of piece 150 and then release piece 150 from end effector 118 after piece 150 has been placed on multilayer material 114 and after compaction.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in some cases, placement of pieces of multilayer material 114 may have been performed. In this implementation, operation 1000 may be omitted such that end effector 118 is used for compacting multilayer material 114 on tool 112.

Figure 13:
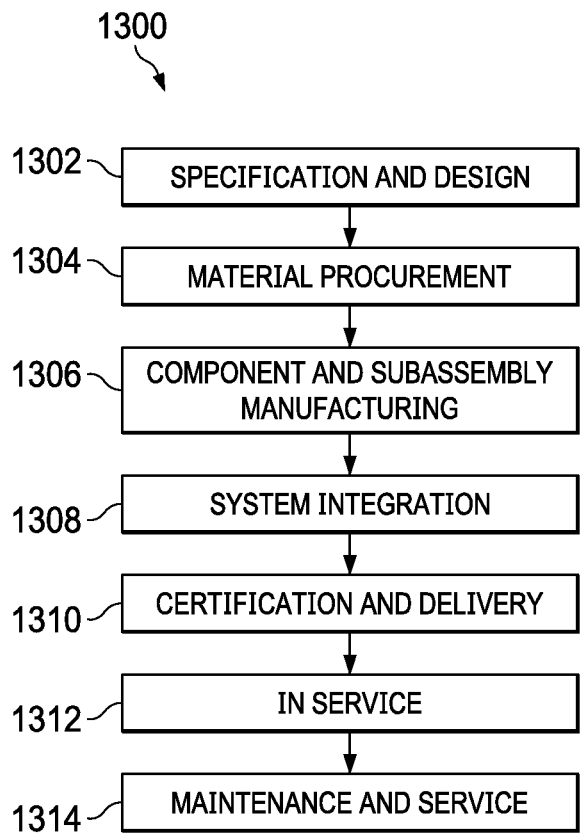
FIG. 13 is an illustration of a block diagram of an aircraft manufacturing and service method in accordance with an illustrative embodiment.
Figure 14:
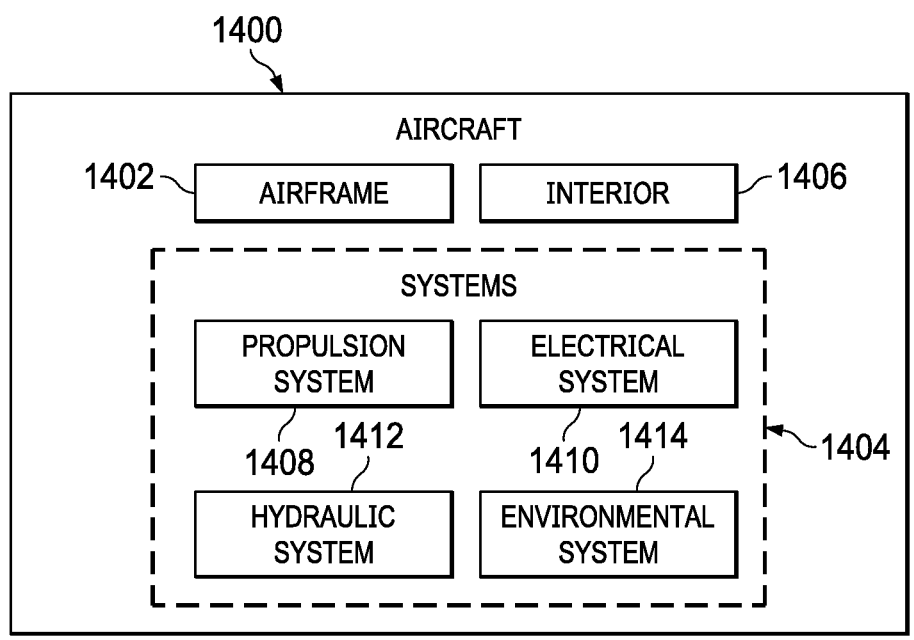
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

As depicted, robot 116 with end effector 118 may be utilized to form multilayer material 114 for use in manufacturing composite structures 102 for airframe 1402 and interior 1406.

Apparatuses and methods embodied herein may be employed during at least one of the stages of aircraft manufacturing and service method 1300 in FIG. 13. For example, robot 116 with end effector 118 of FIG. 1 may be utilized in preparing multilayer material 114 of FIG. 1 for use in manufacturing composite structures wanted to for various components in aircraft 1400.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both.

For example, robot 116 with end effector 118 may be utilized to form multilayer material 114 for use in manufacturing composite structures 102 in component and subassembly manufacturing 1306 in FIG. 13. Additionally, robot 116 with end effector 118 may be utilized to form multilayer material 114 for use in manufacturing composite parts used as a part of system integration 1308 in FIG. 13. As another example, robot 116 with end effector 118 may be utilized to form multilayer material 114 for use in manufacturing composite parts that are used during maintenance and service 1314 of FIG. 13. The composite parts manufactured using multilayer material 114 that are processed by robot 116 with end effector 118 may be used in at least one of modification, reconfiguration, refurbishment, and other maintenance or service that occurs as part of maintenance and service 1314.

The use of a number of the different illustrative embodiments may substantially expedite the assembly of aircraft 1400, reduce the cost of aircraft 1400, or both expedite the assembly of aircraft 1400 and reduce the cost of aircraft 1400. In the illustrative example, robots 116 with end effector 118 may enable forming multilayer material 114 more quickly than compared to current techniques for forming multilayer material 114.

Figure 15:
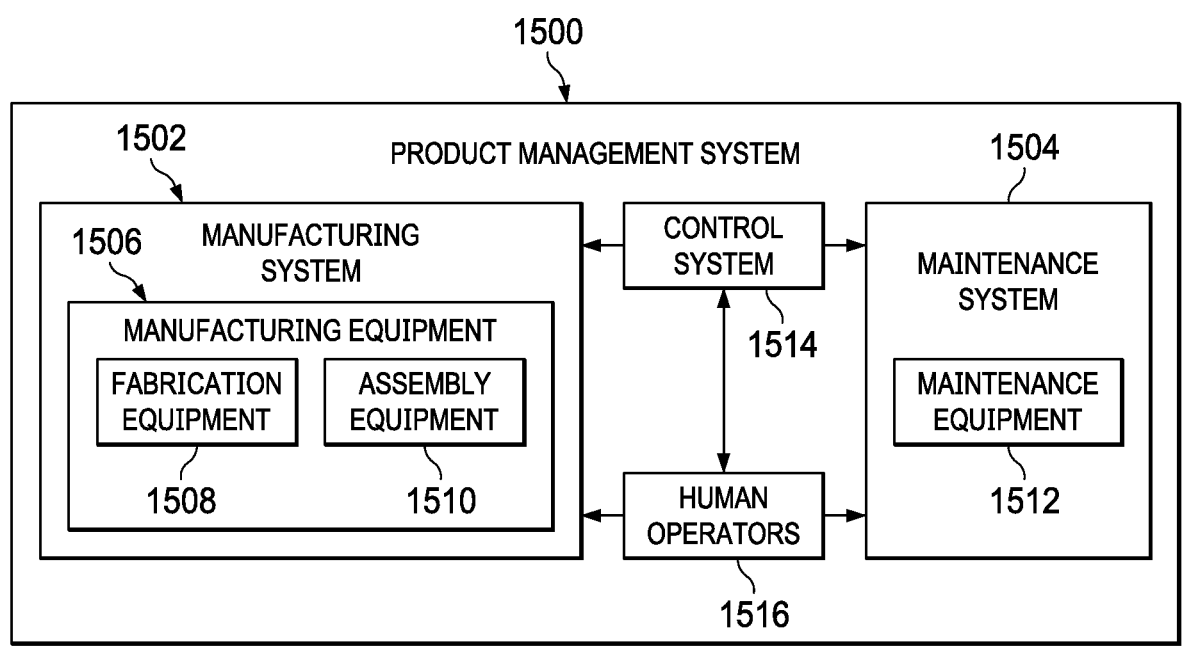
FIG. 15 is an illustration of a block diagram of a product management system in accordance with an illustrative embodiment.

Turning now to FIG. 15, an illustration of a block diagram of a product management system is depicted in accordance with an illustrative embodiment. Product management system 1500 is a physical hardware system. In this illustrative example, product management system 1500 may include at least one of manufacturing system 1502 or maintenance system 1504.

Manufacturing system 1502 is configured to manufacture products, such as aircraft 1400 in FIG. 14. As depicted, manufacturing system 1502 includes manufacturing equipment 1506. Manufacturing equipment 1506 includes at least one of fabrication equipment 1508 or assembly equipment 1510.

Fabrication equipment 1508 is equipment that may be used to fabricate components for parts used to form aircraft 1400. For example, fabrication equipment 1508 may include machines and tools. These machines and tools may be at least one of a drill, a hydraulic press, a furnace, a mold, a composite tape laying machine, a vacuum system, a lathe, or other suitable types of equipment. Fabrication equipment 1508 may be used to fabricate at least one of metal parts, composite parts, semiconductors, circuits, fasteners, ribs, skin panels, spars, antennas, or other suitable types of parts.

For example, fabrication equipment 1508 may include robot 116 in end effector 118 for use in forming multilayer material 114. The use of end effectors such as end effector 118 may reduce the time needed to manufacture composite parts.

Assembly equipment 1510 is equipment used to assemble parts to form aircraft 1400. In particular, assembly equipment 1510 may be used to assemble components and parts to form aircraft 1400. Assembly equipment 1510 also may include machines and tools. These machines and tools may be at least one of a robotic arm, a crawler, a faster installation system, a rail-based drilling system, or a robot. Assembly equipment 1510 may be used to assemble parts such as seats, horizontal stabilizers, wings, engines, engine housings, landing gear systems, and other parts for aircraft 1400.

In this illustrative example, maintenance system 1504 includes maintenance equipment 1512. Maintenance equipment 1512 may include any equipment needed to perform maintenance on aircraft 1400. Maintenance equipment 1512 may include tools for performing different operations on parts on aircraft 1400. These operations may include at least one of disassembling parts, refurbishing parts, inspecting parts, reworking parts, manufacturing replacement parts, or other operations for performing maintenance on aircraft 1400. These operations may be for routine maintenance, inspections, upgrades, refurbishment, or other types of maintenance operations.

In the illustrative example, maintenance equipment 1512 may include ultrasonic inspection devices, x-ray imaging systems, vision systems, drills, crawlers, and other suitable device. In some cases, maintenance equipment 1512 may include fabrication equipment 1508, assembly equipment 1510, or both to produce and assemble parts that may be needed for maintenance.

Product management system 1500 also includes control system 1514. Control system 1514 is a hardware system and may also include software or other types of components. Control system 1514 is configured to control the operation of at least one of manufacturing system 1502 or maintenance system 1504. In particular, control system 1514 may control the operation of at least one of fabrication equipment 1508, assembly equipment 1510, or maintenance equipment 1512.

The hardware in control system 1514 may be using hardware that may include computers, circuits, networks, and other types of equipment. The control may take the form of direct control of manufacturing equipment 1506. For example, robots, computer-controlled machines, and other equipment may be controlled by control system 1514. In other illustrative examples, control system 1514 may manage operations performed by human operators 1516 in manufacturing or performing maintenance on aircraft 1400. For example, control system 1514 may assign tasks, provide instructions, display models, or perform other operations to manage operations performed by human operators 1516. In these illustrative examples, control system 1514 may manage at least one of the manufacturing or maintenance of aircraft 1400 in FIG. 14.

In the different illustrative examples, human operators 1516 may operate or interact with at least one of manufacturing equipment 1506, maintenance equipment 1512, or control system 1514. This interaction may be performed to manufacture aircraft 1400.

Of course, product management system 1500 may be configured to manage other products other than aircraft 1400. Although product management system 1500 has been described with respect to manufacturing in the aerospace industry, product management system 1500 may be configured to manage products for other industries. For example, product management system 1500 may be configured to manufacture products for the automotive industry as well as any other suitable industries.

Thus, the illustrative examples provide a method, apparatus, and system for forming multilayer materials for use in manufacturing composite structures. In one illustrative example, one or more technical solutions are present that overcome a technical problem with laying up layers in the multilayer material. As a result, one or more technical solutions may provide a technical effect of moving a piece of composite material to the location on the multilayer material being laid up. One or more technical solutions also provide a technical effect of applying force to the multilayer material with a piece in place to compact the multilayer material. In this manner, sweeping motion along with force for compaction may occur with one or more of the technical solutions.

In one illustrative example, end effector 118 may be used by robot 116 to process multilayer material 114. The processing of multilayer material 114 may include at least one of laying up pieces onto multilayer material 114 or compacting multilayer material 114. In one illustrative example, piece 150 may be placed onto multilayer material 114 using end effector 118. Force may be applied to piece 150 once placed on multilayer material 114. As depicted, the force may be a sweeping motion on piece 150 using force transfer system 122 while holding piece 150 stationary using vacuum 146. In this manner, piece 150 may be caused to adhere to other pieces in multilayer material 114.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for placing a piece of composite material onto a substrate comprising:
    placing the piece of composite material on the substrate using an end effector;
    holding the piece of composite material against the substrate using the end effector including holding the piece of composite material on a flexible membrane in the end effector, wherein the piece of composite material is held against the substrate on the flexible membrane; and
    compacting the piece of composite material against the substrate while also holding the piece of composite material against the substrate using the end effector including applying a force on the flexible membrane using a force transfer system in the end effector that is rotatably connected to a rotary actuator and rotating the force transfer system about an axis while the force transfer system applies force on the flexible membrane to deform and compact a multilayer material in a sweeping motion, while the piece of composite material remains stationary.

2. The method of claim 1, wherein compacting the piece of composite material against the substrate while also holding the piece of composite material against the substrate using the end effector comprises:
applying a force through the piece of composite material into the substrate with a sweeping motion, wherein the force is sufficient to compact the piece of composite material; and
moving the force over the piece of composite material with the sweeping motion while the piece of composite material remains stationary.

3. The method of claim 2, further comprising:
causing a vacuum between the rotary actuator and the multilayer material using a vacuum system.

4. The method of claim 2, wherein the multilayer material is selected from at least one of a tape, a graphite tape, a glass fiber tape, a fabric, or a prepreg.

5. The method of claim 1, further comprising:
causing a vacuum between the rotary actuator and the multilayer material using a vacuum system.

6. The method of claim 1, wherein the multilayer material is selected from at least one of a tape, a graphite tape, a glass fiber tape, a fabric, or a prepreg.

7. A method for compacting a multilayer material, the method comprising:
moving a rotary actuator in an end effector along an axis towards the multilayer material such that a flexible membrane connected to the rotary actuator contacts the multilayer material at an engagement surface of the flexible membrane in which the flexible membrane does not rotate;
applying a force on the flexible membrane using a force transfer system in the end effector that is rotatably connected to the rotary actuator; and
rotating the force transfer system about the axis by the rotary actuator while the force transfer system applies force on the flexible membrane to deform and compact the multilayer material using a sweeping motion while holding a piece of composite material in place.

8. A method for compacting a multilayer material, the method comprising:
moving a rotary actuator in an end effector along an axis towards the multilayer material such that a flexible membrane connected to the rotary actuator contacts the multilayer material at an engagement surface of the flexible membrane in which the flexible membrane does not rotate;
applying a force on the flexible membrane using a force transfer system in the end effector that is rotatably connected to the rotary actuator;
rotating the force transfer system about the axis by the rotary actuator such that the force transfer system applies force on the flexible membrane to deform and compact the multilayer material using a sweeping motion while holding a piece of composite material in place;
detecting a presence of a piece of composite material at a predetermined location;
moving the end effector along a path to the predetermined location when the piece is detected;
picking up the piece using a vacuum cup on the end effector; and
moving the end effector along the path towards the multilayer material on a tool with the piece attached to flexible membrane using a vacuum applied to the piece by the vacuum cup.

9. The method of claim 7 further comprising:
releasing the piece from the end effector after compacting the piece, wherein the piece remains in place on the multilayer material.

10. A method for compacting a multilayer material, the method comprising:
moving a rotary actuator in an end effector along an axis towards the multilayer material such that a flexible membrane connected to the rotary actuator contacts the multilayer material at an engagement surface of the flexible membrane in which the flexible membrane does not rotate;
applying a force on the flexible membrane using a force transfer system in the end effector that is rotatably connected to the rotary actuator; and
rotating the force transfer system about the axis by the rotary actuator such that the force transfer system applies force on the flexible membrane to deform and compact the multilayer material using a sweeping motion while holding a piece of composite material in place,
wherein rotating the force transfer system about the axis by the rotary actuator such that the force transfer system applies force on the flexible membrane to deform and compact the multilayer material comprises:
rotating the rotary actuator about the axis such that the force transfer system rotates about the axis to move in a circular path and deforms the engagement surface as the rotary actuator rotates the force transfer system such that the piece of composite material is compacted.

11. A method for compacting a multilayer material, the method comprising:
moving a rotary actuator in an end effector along an axis towards the multilayer material such that a flexible membrane connected to the rotary actuator contacts the multilayer material at an engagement surface of the flexible membrane in which the flexible membrane does not rotate;
applying a force on the flexible membrane using a force transfer system in the end effector that is rotatably connected to the rotary actuator; and
rotating the force transfer system about the axis by the rotary actuator such that the force transfer system applies force on the flexible membrane to deform and compact the multilayer material using a sweeping motion while holding a piece of composite material in place,
wherein the rotary actuator comprises a shaft extending along the axis, wherein the shaft does not rotate during operation of the rotary actuator; a body moveably connected to the shaft, wherein the body is rotatable about the axis and moveable along the axis; and a flange extending from the body, wherein force transfer units in the force transfer system are connected to the flange.

12. The method of claim 7, wherein moving the rotary actuator along the axis towards the multilayer material comprises:
moving the end effector towards the multilayer material with a piece of composite material attached to the flexible membrane using a vacuum applied to the piece of composite material.

13. A method for compacting a multilayer material, the method comprising:
moving a rotary actuator in an end effector along an axis towards the multilayer material such that a flexible membrane connected to the rotary actuator contacts the multilayer material at an engagement surface of the flexible membrane in which the flexible membrane does not rotate;

applying a force on the flexible membrane using a force transfer system in the end effector that is rotatably connected to the rotary actuator; and rotating the force transfer system about the axis by the rotary actuator such that the force transfer system applies force on the flexible membrane to deform and compact the multilayer material using a sweeping motion while holding a piece of composite material in place, wherein moving the rotary actuator along the axis towards the multilayer material along the axis in a linear direction comprises:

moving the rotary actuator along the axis towards the multilayer material along the axis in the linear direction using a biasing system that is operable to bias the rotary actuator along the axis towards the multilayer material.

14. The method of claim 7 further comprising:

causing a vacuum between the rotary actuator and the multilayer material using a vacuum system.

15. A method for compacting a multilayer material, the method comprising:

moving a rotary actuator in an end effector along an axis towards the multilayer material such that a flexible membrane connected to the rotary actuator contacts the multilayer material at an engagement surface of the flexible membrane in which the flexible membrane does not rotate;

applying a force on the flexible membrane using a force transfer system in the end effector that is rotatably connected to the rotary actuator;

rotating the force transfer system about the axis by the rotary actuator such that the force transfer system applies force on the flexible membrane to deform and compact the multilayer material using a sweeping motion while holding a piece of composite material in place; and a vacuum cup, wherein the flexible membrane extends from the vacuum cup such the piece of composite material is held against the flexible membrane when a vacuum is applied using the vacuum cup.

16. A method for compacting a multilayer material, the method comprising:

moving a rotary actuator in an end effector along an axis towards the multilayer material such that a flexible membrane connected to the rotary actuator contacts the multilayer material at an engagement surface of the flexible membrane in which the flexible membrane does not rotate;

applying a force on the flexible membrane using a force transfer system in the end effector that is rotatably connected to the rotary actuator; and rotating the force transfer system about the axis by the rotary actuator such that the force transfer system applies force on the flexible membrane to deform and compact the multilayer material using a sweeping motion while holding a piece of composite material in place, wherein the flexible membrane has a thickness that allows flexing of the flexible membrane by the force transfer system when the rotary actuator is biased towards the multilayer material such that the engagement surface of the flexible membrane engages the multilayer material to hold the piece of composite material against the multilayer material, and wherein the thickness prevents mark-off from occurring on the piece of material.

17. The method of claim 7, wherein the multilayer material is selected from at least one of a tape, a graphite tape, a glass fiber tape, a fabric, or a prepreg.

18. A method for placing a piece of a composite material, the method comprising:

picking up the piece of the composite material from a source using an end effector using a vacuum applied to the piece;

moving the end effector along a path towards a multilayer material with a piece of the multilayer material attached to a flexible membrane in the end effector using the vacuum applied to the piece of the multilayer material;

placing the piece on the multilayer material on a tool;

moving a rotary actuator in the end effector along an axis towards the multilayer material using a biasing system that is operable to bias the rotary actuator along the axis towards the multilayer material such that a flexible membrane connected to the rotary actuator contacts the multilayer material at an engagement surface of the flexible membrane in which the flexible membrane does not rotate; the rotary actuator comprises a shaft extending along the axis in which the shaft does not rotate during operation of the rotary actuator; an impeller that is translatable along the shaft; a body moveably connected to the shaft in which the body is rotatable about the axis and moveable along the axis; and a flange extending from the body in which ball transfer units in a force transfer system are connected to the flange;

applying a force on the flexible membrane using the force transfer system in the end effector that is rotatably connected to the rotary actuator;

rotating the force transfer system about the axis by the rotary actuator such that the force transfer system moves in a circular path and applies force on the flexible membrane to deform and compact the multilayer material with a sweeping motion; and releasing the piece from the end effector in which the piece remains in place on the multilayer material.

19. The method of claim 18, wherein the flexible membrane has a thickness that allows flexing of the flexible membrane by the force transfer system when the rotary actuator is biased towards the multilayer material such that the engagement surface of the flexible membrane engages the multilayer material to hold the piece of composite material against the multilayer material, and wherein the thickness prevents mark-off from occurring on the piece of material.

20. The method of claim 18, wherein the multilayer material is selected from at least one of a tape, a graphite tape, a glass fiber tape, a fabric, or a prepreg.

* * * * *